United States Patent [19]

Merkel

[11] Patent Number: 5,510,953

[45] Date of Patent: Apr. 23, 1996

[54] CONCEALED LOCKING ASSEMBLY FOR A REMOVABLE PORTABLE COMPUTER KEYBOARD

[75] Inventor: Harold S. Merkel, Houston, Tex.

[73] Assignee: COMPAQ Computer Corporation, Houston, Tex.

[21] Appl. No.: 342,698

[22] Filed: Nov. 21, 1994

[51] Int. Cl.⁶ .................................................... G06F 1/16
[52] U.S. Cl. ........................... 361/680; 361/683; 200/5 A
[58] Field of Search ..................................... 361/679–685; 200/5 A; 235/145 R, 146; 341/22; 345/168–169; 400/682, 663; 248/221.1–221.4

[56] References Cited

U.S. PATENT DOCUMENTS 5,153,589  10/1992  Heys, Jr. et al. ...................... 341/22
5,400,055   3/1995  Ma et al. ............................. 345/168

*Primary Examiner*—Leo P. Picard
*Assistant Examiner*—Jayprakash N. Gandhi
*Attorney, Agent, or Firm*—Konneker & Bush

[57] ABSTRACT

The top side wall of a portable computer base housing portion has a rectangular opening therein that complementarily receives a keyboard assembly. The keyboard assembly has a rear side edge portion from which a spaced plurality of mounting tabs outwardly project, and a spaced plurality of latch structures are captively retained on a front side edge portion of the keyboard assembly. Each latch structure includes a tab member that is slidable relative to the balance of the keyboard assembly between a forwardly extended position and a rearwardly retracted position, and a cap portion pivotally retained on the tab member. To install the keyboard assembly in the base housing top side opening the assembly is placed in the top side opening, the rear side tabs are inserted into corresponding openings in the top base housing side wall, the front side tabs are forwardly moved to their extended positions in which they enter facing openings in the base housing top side wall, and the cap portion are pivoted inwardly against the top side of the keyboard assembly and latched into place thereon to prevent the front side tabs from rearwardly moving to their retracted release positions. To subsequently remove the keyboard, the cap portions are upwardly pivoted to unlatch them, the unlatched cap portions are rearwardly moved to move the front side tabs to their retracted positions, and the cap portions are lifted to remove the keyboard assembly from the base housing top side opening.

19 Claims, 3 Drawing Sheets

CONCEALED LOCKING ASSEMBLY FOR A REMOVABLE PORTABLE COMPUTER KEYBOARD

BACKGROUND OF THE INVENTION

1. Field of the Invention

The present invention generally relates to computer apparatus, and more particularly relates to portable computer keyboards.

2. Description of Related Art

In conventional compact portable computers, such as the increasingly popular notebook computer, a lid portion having a display screen thereon is pivotally secured to a base housing for pivotal movement relative thereto between a closed position in which the lid portion covers the top side of the base housing, and an open position in which the lid portion uncovers the top side of the base housing and exposes a keyboard mounted thereon.

Keyboards incorporated in portable computers of this general type are conventionally secured within openings in their associated base housings using a series of small screws. While this is a simple and reliable technique for securing the keyboard to the base housing, it carries with it several problems, limitations and disadvantages.

For example, a screwdriver must be used both to install and remove the keyboard, thereby increasing both the initial fabrication time for the computer and the time to subsequently disassemble it for service. Moreover, several additional separate parts (i.e, the screws) are needed to mount the keyboard on the base housing, and these small fastening members can easily fall into the inner workings of the computer in a location therein in which they are difficult to retrieve. Additionally, it is considered to aesthetically desirable to conceal the installed mounting screws from the view of the purchaser or user of the computer. The concealment of the screws typically dictates that they be positioned in locations in which they cannot be immediately accessed to remove the keyboard. Thus, although the keyboard attachment aesthetics are enhanced, is installation and removal are impeded.

As can readily be seen from the foregoing, it would be desirable to provide improved apparatus for removably securing a keyboard to the base housing of a portable computer which eliminates or at least substantially reduces the above-mentioned problems, limitations and disadvantages commonly associated with conventional keyboard securement apparatus. It is accordingly an object of the present invention to provide such improved keyboard securement apparatus.

SUMMARY OF THE INVENTION

In carrying out principles of the present invention, in accordance with a preferred embodiment thereof, a portable computer, representatively a notebook computer, is provided and includes a housing having a top side wall with an opening formed therein. The top housing side wall has opposite first and second peripheral edge portions partially bounding the top side opening.

The portable computer also includes a keyboard assembly having a top side upon which a series of key members are operatively mounted, and first and second opposite side edge portions. The keyboard assembly is complementarily receivable in the top side wall opening with said first and second opposite side edge portions of said keyboard assembly respectively facing the first and second peripheral edge portions of the top housing side wall.

Mounting means are provided for releasably securing the keyboard assembly in the housing top side wall opening. In a preferred embodiment of the invention the mounting means include (1) spaced pluralities of openings extending through the first and second peripheral edge portions of the housing top side wall; (2) a spaced plurality of fixed projections formed on the first side edge of the keyboard assembly and removably receivable in the openings in the first peripheral side edge portion of the housing top side wall; (3) a plurality of locking members slidably and captively received in the openings in the second side edge of keyboard assembly for movement relative thereto between extended positions in which outer ends of the locking members are received in the openings in the second peripheral edge portion of the housing top side opening, and retracted positions in which the locking members are withdrawn from the openings in the second peripheral edge portion of the housing top side opening; and (4) latching means, carried above the top side of the keyboard assembly, for removably holding the locking members in their extended positions.

To rapidly install the keyboard assembly in the housing top side wall opening, the locking members are moved to their retracted positions, the keyboard assembly is placed within the housing top side wall opening, the fixed projections on the first side edge of the keyboard assembly are inserted into the openings in the first peripheral edge portion of the housing top side wall, the locking members are moved from their retracted positions to their extended positions within the openings in the second peripheral side portion of the housing top side wall, and the latching means are operated to releasably hold the locking members in their extended positions to releasably lock the keyboard assembly in the housing top side wall opening without the use of tools.

Preferably, the openings in the second side edge of the keyboard assembly have laterally narrowed upper side portions that open through the top side of the keyboard assembly, and the latching means include cap members pivotally secured to pivot mounting structures extending upwardly from the top sides of the locking members through the open top sides of the openings that slidably receive them, and latching structures projecting upwardly from the top side of the keyboard assembly. To releasably latch the locking members in their extended positions, the cap members are downwardly pivotable toward the top side of the keyboard assembly and may be releasably snapped onto the latching structures.

In this downwardly pivoted latching position of the cap members they extend over and conceal the open top sides of the openings that slidably receive the locking members. When the cap members are pivoted upwardly from their latching position, and unsnapped from their underlying latching structures, they permit the locking members to be moved from their extended positions to their retracted positions, thereby permitting the keyboard assembly to be lifted out of the housing top side wall opening. The upwardly pivoted cap members form convenient lifting handles to assist in manually removing the keyboard assembly from the top housing side wall opening.

DETAILED DESCRIPTION

Figure 1:
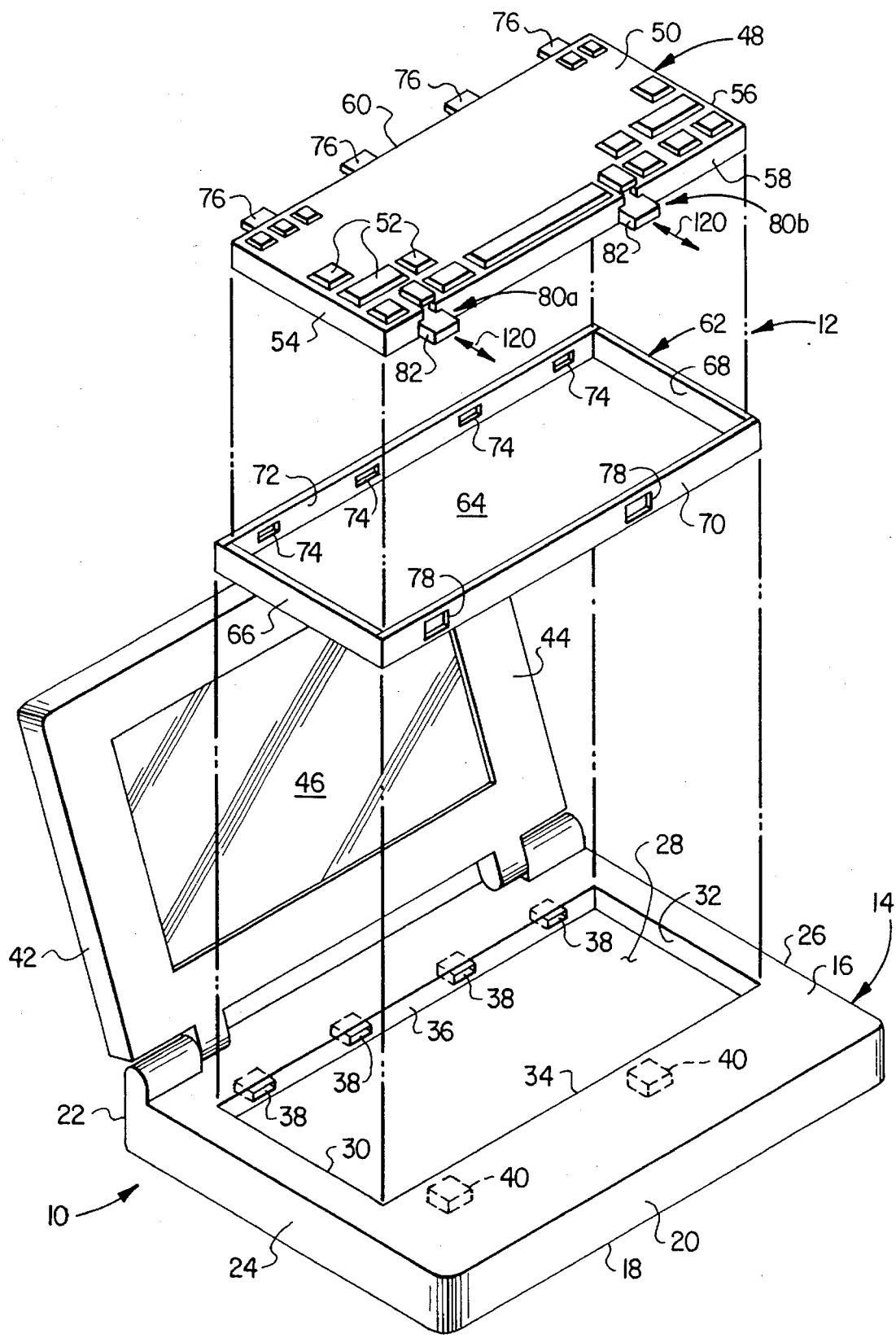
FIG. 1 is a simplified, partially exploded perspective view of a portable computer having a removable keyboard incorporating therein a concealed installation locking tab mechanism embodying principles of the present invention.
Figure 2:
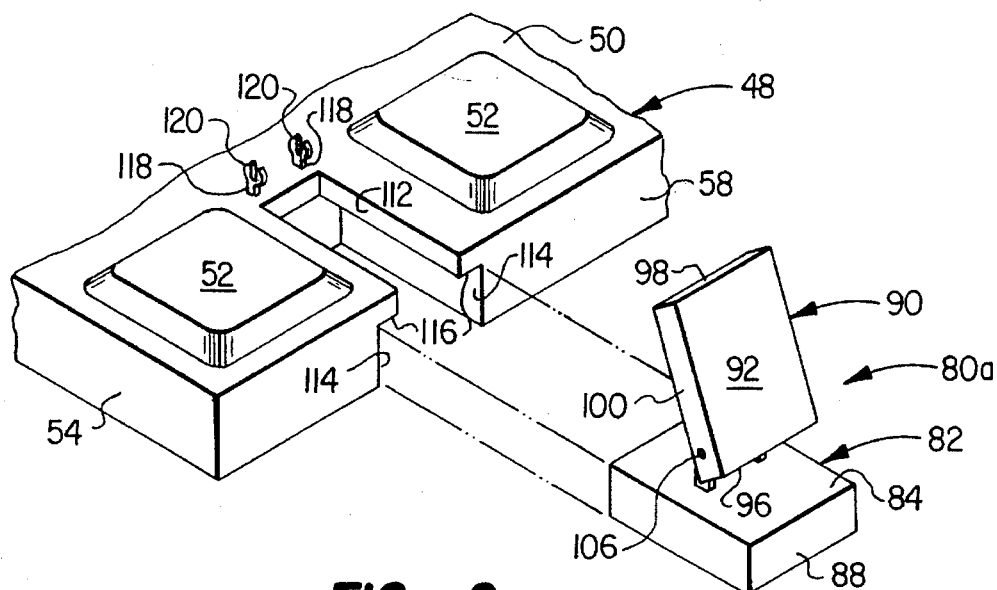
FIG. 2 is an enlarged scale partially exploded perspective view of a left front corner portion of a monoblock section of the keyboard and a slidable lock tab assembly captively retained thereon.

Perspectively illustrated in FIG. 1, in simplified, partially exploded form, is a portable computer 10 having a specially designed removable keyboard assembly 12 embodying principles of the present invention. Portable computer 10 is representatively a notebook computer and includes a rectangular base housing 14 having a top side wall 16, a bottom wall 18, front and rear side walls 20 and 22, and left and right end walls 24 and 26. A rectangular opening 28 is formed in the top base housing side wall 16 and removably receives the keyboard assembly 12 in a manner subsequently described herein.

Opening 28 is bordered by opposite left and right interior peripheral end edge surfaces 30,32 of the top side wall 16, and by opposite front and rear interior peripheral side edge surfaces 34,36 of the top side wall 16. A spaced plurality of generally rectangularly cross-sectioned openings 38 (representatively four in number) extend rearwardly into the top side wall 16 through its rear peripheral side edge 36, and a spaced plurality of generally rectangularly cross-sectioned openings 40 (representatively two in number) extend forwardly into the top side wall 16 through its front peripheral side edge 34.

The portable computer 10 also includes a rectangular lid housing 42 with a front or inner side 44 on which a display screen 46 is operatively mounted. Lid housing 42 is pivotally secured to a top rear side edge portion of the base housing 14 for pivotal movement relative thereto between an open position, shown in FIG. 1, in which the lid housing 42 exposes the top side wall 16 of the base housing 14, and a closed position (not shown) in which the lid housing 42 is pivoted down over and covers the top base housing side wall 16. Suitable latch means (not shown) are provided for releasably holding the lid housing 42 in its closed position.

The keyboard assembly 12 includes a rectangularly configured plastic monoblock support structure 48 having a top side 50 upon which a spaced series of manually depressible key members 52 are operatively mounted, left and right end surfaces 54 and 56, and front and rear side surfaces 58 and 60. Monoblock support structure 48 is complementarily received in a rectangular, open topped sheet metal base pan 62 having a bottom wall 64, left and right end walls 66 and 68, and front and rear side walls 70 and 72. The base pan 62, in turn, is complementarily received in the opening 28 in the top side wall 16 of the base housing 14.

Four horizontally spaced apart rectangular slots 74 are formed through the rear side wall 72 of the base pan 62, and four rectangular tabs 76 project outwardly from the rear side 60 of the monoblock structure 48 and extend outwardly through the slots 74 in the base pan rear side wall 72. With the keyboard assembly 12 operatively disposed within the base housing top side wall opening 28, the tabs 76 are removably received in the rectangular openings 38 in the rear peripheral side edge 36 of the base housing top side wall opening 28.

Figure 3:
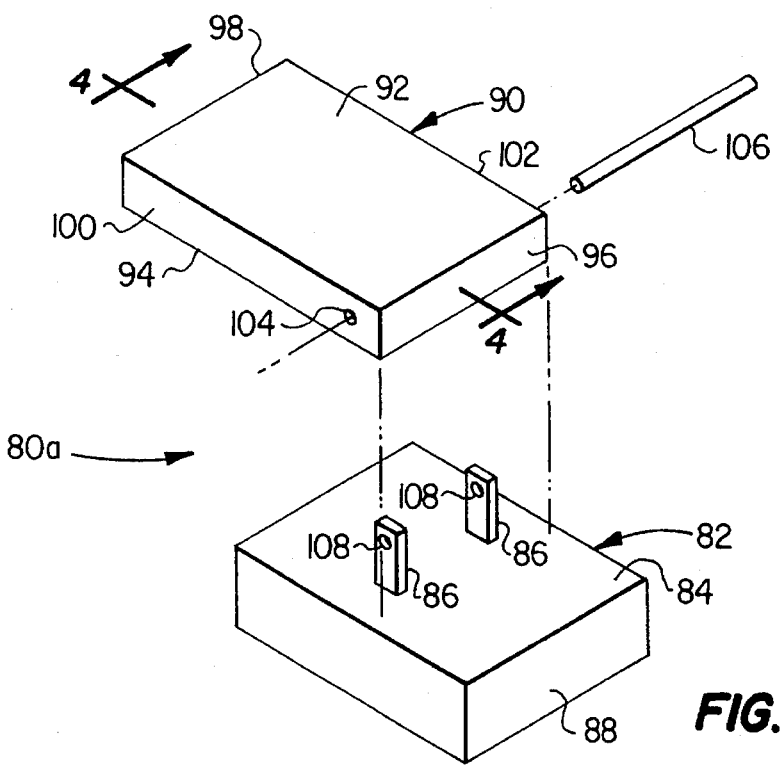
FIG. 3 is an enlarged scale exploded perspective view of the slidable locking tab assembly.
Figure 4:
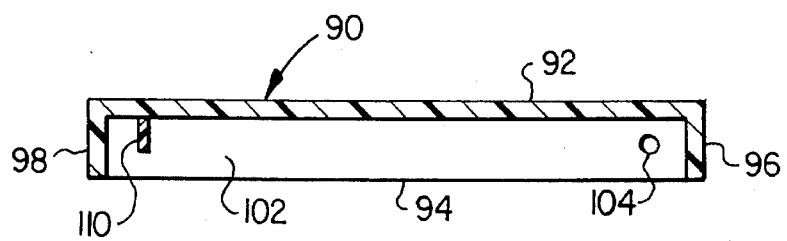
FIG. 4 is a cross-sectional view through a latching cap portion of the slidable locking tab assembly taken along line 4—4 of FIG. 3.

The keyboard assembly 12 is releasably locked within the base housing side wall opening 28 by a pair of specially designed latching structures 80a and 80b embodying principles of the present invention and captively retained on the monoblock structure 48. Latching structures 80a,80b are identical to one another, and the structure and operation of latching structure 80a will now be described with initial reference to FIGS. 3 and 4.

Latching structure 80a includes an elongated rectangular tab member 82 having a top side 84 from which a pair of hinge support posts 86 upwardly project, and a front end 88; and a hollow rectangular latching cap 90 having a top side wall 92, an open bottom side 94, front and rear end walls 96 and 98, and left and right side walls 100 and 102 having circular holes 104 formed therein adjacent the front end wall 96. The latching cap 90 is pivotally secured to the top side of the tab member 82 by means of a hinge pin 106 extended through the side wall openings 104 and corresponding openings 108 in the support posts 86. For reasons subsequently described, an interior web 110 is formed within the cap 90 near and parallel to its rear end wall 98.

Referring now to FIGS. 2 and 5–7, at the location of each of the latching structures 80a,80b a slot 112 extends rearwardly through the front side surface 58 of the monoblock structure 48, between an adjacent pair of key members 52. The slot 112 opens upwardly through the top side 50 of the monoblock structure 48 and has a pair of undercut opposite side portions 114 that form downwardly facing ledge portions 116 on opposite sides of the slot 112. Projecting upwardly from the top side 50 of the monoblock structure 48, at the inner end of each slot 112, are a pair of latch posts 118 having bifurcated upper ends 120.

Figure 5:
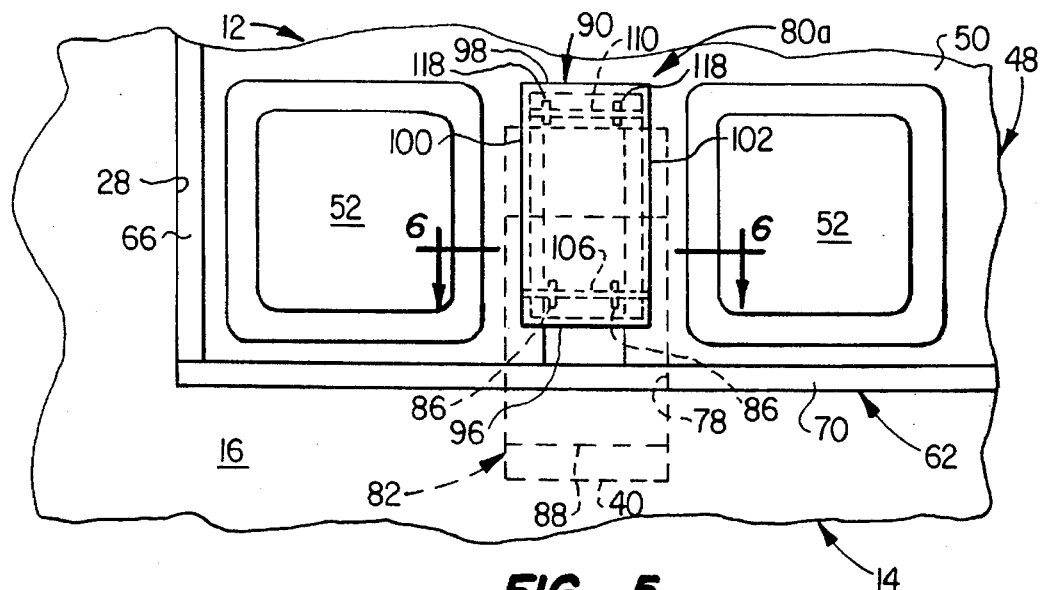
FIG. 5 is an enlarged scale partial top plan view of the base housing section of the computer with the keyboard removably installed therein and the slidable locking tab in an extended locking position thereof.
Figure 6:
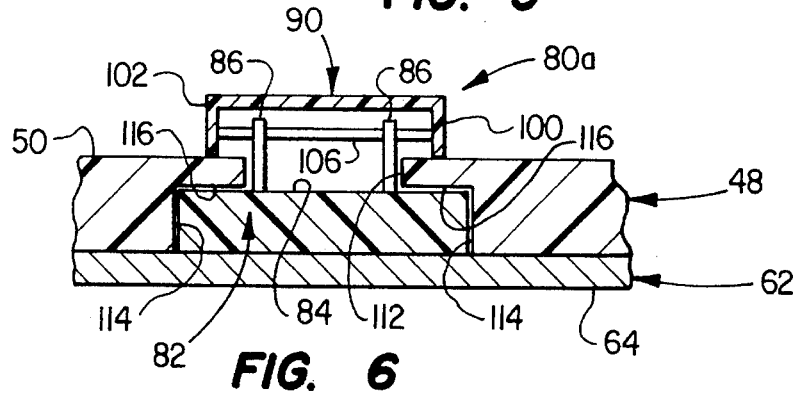
FIG. 6 is an enlarged scale partial cross-sectional view through the installed keyboard taken along line 6—6 of FIG. 5.
Figure 7:
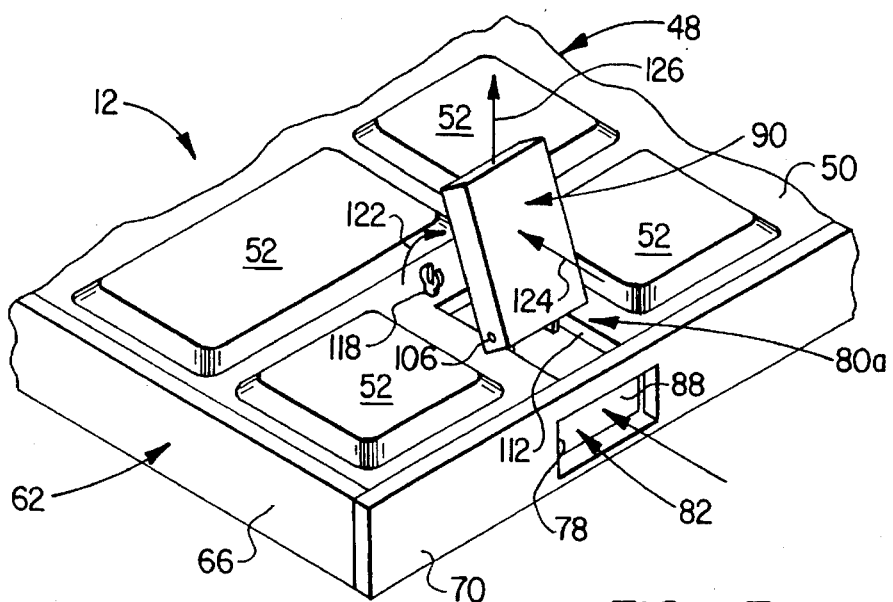
FIG. 7 is an enlarged scale partial perspective view of a portion of the keyboard removed from the computer base housing and illustrating the slidable locking tab in a retracted release position thereof.

As best illustrated in FIGS. 5–7, the two tabs 82 are slidingly received in the widened lower sides of the slots 112, which are aligned with the openings 78 formed in the front side wall 70 of the base pan 62. Each pair of support posts 86 project upwardly through the narrowed top side of one of the slots 112, and the latching caps 90 are pivotally supported over the top side 50 of the monoblock support structure 48 between adjacent pairs of key members 52. The tabs 82, as indicated by the double-ended arrows 120 in FIG. 1, are slidably movable relative to the monoblock structure 48 between a forwardly extended locking position (see FIG. 5) in which the tabs 82 are received in the openings 40 in the front peripheral side edge 34 of the top base housing side wall 16 and preclude removal of the keyboard assembly 12 from the base housing opening 28, and a rearwardly retracted position (see FIG. 7) in which the front ends 88 of the tabs 82 are generally flush with the outer side of the front side wall 70 of the base pan 62, thereby removing the tabs 82 from the base housing openings 40 and permitting the keyboard assembly 12 to be upwardly removed from the base housing top side opening 28.

To initially install the keyboard assembly 12 in the top base housing side opening 28, the caps 90 are pivoted upwardly, and the front side tabs 82 on the assembly 12 are rearwardly moved to their retracted positions shown in FIG. 7. The keyboard assembly 12, in a slightly rearwardly canted orientation, is then placed in the housing opening 28 and then forwardly tilted to cause the keyboard assembly rear side tabs 76 (see FIG. 1) to enter their associated base housing top side wall openings 38. Next, the caps 90 are grasped and moved forwardly to slide the front side tabs 82 to their forwardly extended locking positions in which they enter their associated base housing top side wall openings 40 (see FIG. 5). Finally, the caps 90 are downwardly pivoted to cause their web portions 110 to removably snap into the bifurcated top ends 120 of the latch posts 120. This releasably holds the front side tabs 82 in their locking positions, thereby releasably locking the keyboard assembly 12 on the base housing 14, and hides the top sides of the slots 112, and the underlying tabs 82, beneath the caps 90. Like the front side tabs 82, the rear side tabs 76 are also hidden from view. The latching of the caps 90 to the underlying latch posts 118 prevents rearward movement of the latching structures 80a, 80b relative to the monoblock support structure 48 and corresponding rearward movement of the front side tabs 82 to their retracted position.

Accordingly, the keyboard assembly 12 may be quickly and easily locked into place within the base housing 28 without the use of any tools, and without the possibility of dropping any small attachment parts into the interior of the base housing 14, since the two latching structures 80a,80b and the rear side tabs 76 are captively retained on the monoblock structure 48.

By simply reversing the installation procedure described above, the keyboard assembly 12 may be quickly and easily removed from the base housing 14 without using any tools. This removal is effected by (1) pivoting the caps 90 upwardly from their FIG. 5 closed positions, as indicated by the arrow 122 in FIG. 7, to unlatch the caps 90 from the underlying latch posts 118, (2) sliding the latch structures 80a,80b rearwardly, as indicated by the arrow 124 in FIG. 7, to rearwardly move the front side tabs 82 to their retracted release positions, and then (3) lifting up on the upwardly pivoted caps 90, as indicated by the arrow 126 in FIG. 7, to remove the keyboard assembly 12 from the base housing opening 28. The caps 90 thus serve three functions—namely, hiding the front side tabs 82 and their associated slots 112, latching the tabs 78 in their forwardly extended locking positions, and serving as handles for manually removing the unlatched keyboard assembly 12 from the base housing opening 28.

The foregoing detailed description is to be clearly understood as being given by way of illustration and example only, the spirit and scope of the present invention being limited solely by the appended claims.

What is claimed is:

1. A computer comprising:
   a housing having a top side wall with an opening formed therein, said top side wall having opposite first and second peripheral edge portions partially bounding said opening;
   a keyboard assembly having a top side upon which a series of key members are operatively mounted, and first and second opposite side edge portions, said keyboard assembly being complementarily receivable in said top side wall opening with said first and second opposite side edge portions of said keyboard assembly respectively facing said first and second peripheral edge portions of said top side wall of said housing; and
   mounting means for releasably securing said keyboard assembly in said housing top side wall opening, said mounting means including:
   a first spaced plurality of openings formed in said first side edge portion of said keyboard assembly and extending inwardly therethrough toward said second side edge portion of said keyboard assembly,
   a second spaced plurality of openings extending inwardly through said first peripheral edge portion of said top housing side wall and being alignable with said first spaced plurality of openings,
   a first spaced plurality of locking members captively retained in said first spaced plurality of openings for movement relative to said keyboard assembly between an extended position in which said first plurality of locking members project outwardly beyond said first side edge portion of said keyboard assembly and are received in said second spaced plurality of openings, and a retracted position in which said first plurality of locking members are withdrawn from said second spaced plurality of openings, and
   latching means, positioned above said top side of said keyboard assembly, for releasably holding said first spaced plurality of locking members in said extended positions thereof.

2. The computer of claim 1 wherein said mounting means further include:
   a second spaced plurality of locking members projecting outwardly from said second side edge portion of said keyboard assembly in a fixed relationship therewith, and
   a third spaced plurality of openings extending inwardly through said second peripheral edge portion of said top housing side wall and being positioned and configured to removably receive said second spaced plurality of locking members.

3. The computer of claim 1 wherein said computer is a portable computer.

4. The computer of claim 1 wherein, at each of said first spaced plurality of locking members, said latching means include:
   a latch structure projecting upwardly from said top side wall of said housing, and
   a cap member connected to the locking member and positioned above said top side wall of said housing, said cap member being pivotable relative to the locking member between first and second positions,
   said cap member in said first position permitting the locking member to be moved between its extended and retracted positions,
   said cap member, when the locking member is in its extended position, being pivotable from its first position to its second position and releasably connectable to said latch structure to prevent the locking member from moving from its extended position to its retracted position.

5. The computer of claim 4 wherein:
   each cap member is pivotally secured to its associated locking member for translational movement therewith between said extended and retracted positions.

6. The computer of claim 5 wherein:
   each of said openings in said first spaced plurality thereof has a laterally narrowed open side portion extending upwardly through said top side of said keyboard assembly, each of said first spaced plurality of locking members has a top side from which a pivot connection portion upwardly projects through one of the laterally narrowed open side portions of said first spaced plurality of openings, and each of said cap members is pivotally secured to one of said pivot connection portions.

7. The computer of claim 6 wherein:

each of said cap members has an underside upon which a depending web portion is formed, said web portion being releasably connectable to one of said latch structures when the cap member is in its second position and its associated locking member is in its extended position.

8. A keyboard assembly for a computer, comprising:

a generally rectangular monoblock support structure having a top side upon which a spaced series of manually depressible key members are operatively mounted, a front side edge through which a spaced plurality of openings inwardly extend, and a rear side edge from which a spaced series of generally tab-shaped projections outwardly extend;

a plurality of locking tabs slidably carried in said plurality of openings for forward and rearward movement relative to said monoblock support structure between extended positions in which said locking tabs project outwardly beyond said front side edge of said monoblock support structure, and retracted positions in which said locking tabs are retracted rearwardly from their extended positions; and latching means, positioned above said top side of said monoblock support structure, for releasably holding said first spaced plurality of locking tabs in said extended positions thereof.

9. The keyboard assembly of claim 8 wherein, at each of said locking tabs, said latching means include:

a latch structure projecting upwardly from said top side of said monoblock support structure, and a cap member connected to the locking tab, and positioned above said top side of said monoblock support structure, said cap member being pivotable relative to the locking tab between first and second positions, said cap member in said first position permitting the locking tab to be moved between its extended and retracted positions, said cap member, when the locking tab is in its extended position, being pivotable from its first position to its second position and releasably connectable to said latch structure to prevent the locking tab from moving from its extended position to its retracted position.

10. The keyboard assembly of claim 9 wherein:

each cap member is pivotally secured to its associated locking tab for translational movement therewith between said extended and retracted positions.

11. The keyboard assembly of claim 10 wherein:

each of said plurality of openings has a laterally narrowed open side portion extending upwardly through said top side of said monoblock support structure, each of said locking tabs has a top side from which a pivot connection portion upwardly projects through one of the laterally narrowed open side portions of said plurality of openings, and each of said cap members is pivotally secured to one of said pivot connection portions.

12. The keyboard assembly of claim 11 wherein:

each of said cap members has an underside upon which a depending web portion is formed, said web portion being releasably connectable to one of said latch structures when the cap member is in its second position and its associated locking tab is in its extended position.

13. The keyboard assembly of claim 8 further comprising:

an open-topped rectangular base pan structure downwardly and complementarily receiving said monoblock support structure, said base pan structure having a bottom wall from which opposite front and rear side walls upwardly project, said front side wall having a spaced plurality of openings therein that receive outer end portions of said locking tabs, said rear side wall having a spaced plurality of openings therein through which said generally tab-shaped projections on said rear side edge of said monoblock support structure outwardly project.

14. A computer comprising:

a housing having a top side wall with a rectangular opening formed therein, said top side wall having opposite front and rear peripheral side edge portions partially bounding said opening, said front and rear peripheral side edge portions each having a spaced plurality of openings extending inwardly therethrough; and a keyboard assembly removably received in said housing top side wall opening and including:

a generally rectangular monoblock support structure having a top side upon which a spaced series of manually depressible key members are operatively mounted, a front side edge through which a spaced plurality of openings inwardly extend, and a rear side edge from which a spaced series of generally tab-shaped projections outwardly extend, said generally tab-shaped projections being removably received in said plurality of openings in said rear peripheral side edge portion of said top side opening, an open-topped rectangular base pan structure complementarily received in said housing top side opening and, in turn, downwardly and complementarily receiving said monoblock support structure, said base pan structure having upturned front and rear side edge walls, said rear side edge wall having openings therein through which said generally tab-shaped projections extend, said front side edge wall having a spaced plurality of openings extending therethrough, a plurality of locking tabs slidably carried in said plurality of openings in said front side edge of said monoblock support structure for forward and rearward movement relative thereto, said locking tabs extending through said plurality of openings in said front side edge wall of said base pan structure and being in forwardly extended positions in which they project outwardly beyond said front side edge wall of said base pan structure into said plurality of openings in said front peripheral side edge portion of said housing top side wall and prevent removal of said keyboard assembly from said top side opening, said locking tabs being rearwardly movable from said extended positions to retracted positions in which said locking tabs are removed from said plurality of openings in said front peripheral side edge portion of said top side opening and permit removal of said keyboard assembly from said top side opening, and latching means, positioned above said top side of said monoblock support structure, for releasably holding said locking tabs in said extended positions thereof to thereby removably hold said keyboard assembly in said top side opening of said housing.

15. The computer of claim 14 wherein, at each of said locking tabs, said latching means include: a latch structure projecting upwardly from said top side of said monoblock support structure, and

- a cap member connected to the locking tab, and positioned above said top side of said monoblock support structure, said cap member being pivotable relative to the locking tab between first and second positions, said cap member in said first position permitting the locking tab to be moved between its extended and retracted positions, said cap member, when the locking tab is in its extended position, being pivotable from its first position to its second position and releasably connectable to said latch structure to prevent the locking tab from moving from its extended position to its retracted position.

16. The computer of claim 15 wherein:

each cap member is pivotally secured to its associated locking tab for translational movement therewith between said extended and retracted positions.

17. The computer of claim 16 wherein:

each of said plurality of openings in said front side edge of said monoblock support structure has a laterally narrowed open side portion extending upwardly through said top side of said monoblock support structure, each of said locking tabs has a top side from which a pivot connection portion upwardly projects through one of the laterally narrowed open side portions of said plurality of openings in said front side edge of said monoblock support structure, and each of said cap members is pivotally secured to one of said pivot connection portions.

18. The computer of claim 17 wherein: each of said cap members has an underside upon which a depending web portion is formed, said web portion being releasably connectable to one of said latch structures when the cap member is in its second position and its associated locking tab is in its extended position.

19. The computer of claim 14 wherein said computer is a portable computer.

\* \* \* \* \*